Sept. 9, 1969    H. HACKENBERG    3,465,658
PHOTOGRAPHIC CAMERA WITH A FILM TAKE-UP SPOOL
Filed April 28, 1966    2 Sheets-Sheet 1

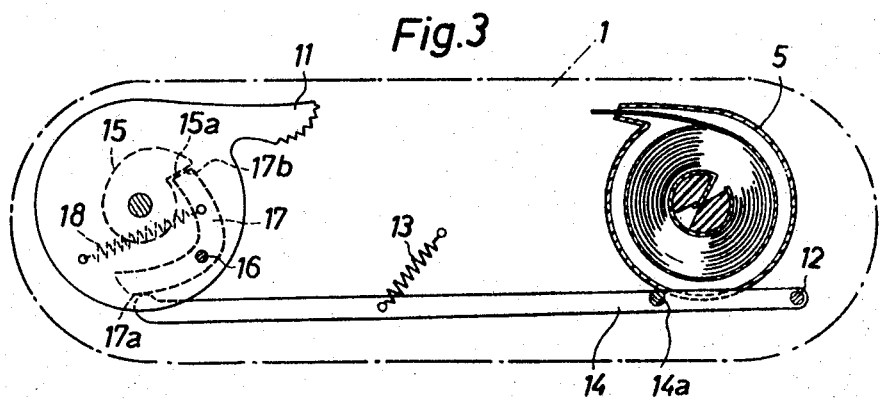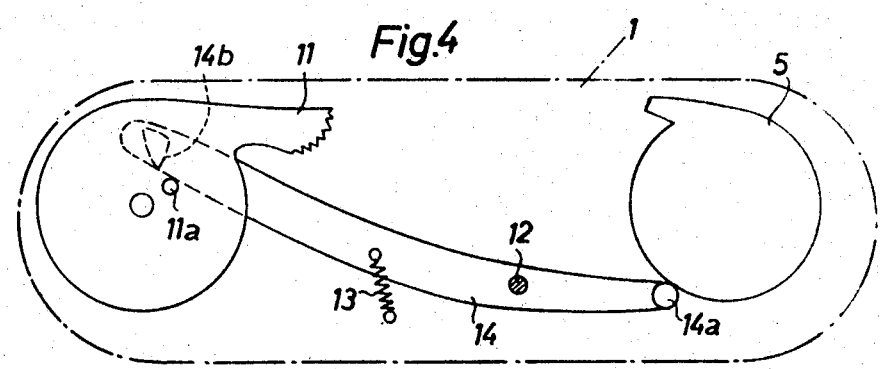

United States Patent Office 3,465,658
Patented Sept. 9, 1969

3,465,658
PHOTOGRAPHIC CAMERA WITH A FILM TAKE-UP SPOOL
Hubert Hackenberg, Munich-Solln, Germany, assignor to AGFA-Gevaert Aktiengesellschaft, Leverkusen, Germany
Filed Apr. 28, 1966, Ser. No. 545,950
Claims priority, application Germany, May 3, 1965,
A 23,696
Int. Cl. G03b *19/04*
U.S. Cl. 95—31                                9 Claims

ABSTRACT OF THE DISCLOSURE

A photographic camera including a film take-up spool and a film magazine cartridge with a winding band being connected to the spool for seizing the film from the cartridge to permit the film to be transferred to the take-up spool upon rotation of the spool. The camera includes a detecting lever which is biased toward the space normally occupied by the cartridge to detect the presence of a cartridge and to prevent rotation of the take-up spool when there is no cartridge in the camera.

---

This improvement relates to a camera with a film take-up or winding spool, arranged preferably in a cartridge, and provided with a winding member having teeth arranged thereon for connection to the film perforations.

Cameras of this type are already known. In them, the lead end of the film is manually or automatically connected to the teeth of the band, flange or other winding member. In the film movement, first the flange is wound on the film take-up spool. Since the film is connected to the flange, the film is carried along with it and also wound on the spool. In these known arrangements it can occur that the operator turns the film feed handle without having the film actually hooked on the flange. When this happens the flange is wound on the take-up spool or is pulled into the interior of the cartridge, becomes unexposed and is thus no longer available for connecting of the film start.

An object of this invention is to provide for a camera of the above-mentioned type, a device for the prevention of the turning of the film take-up spool when there is no film.

In accordance with this invention, this device can consist of a lever scanning or biassed toward the space for the film magazine cartridge. When the magazine cartridge is missing, the lever disengages a coupling between the film forward moving handle and the film take-up spool and/or the sprocket wheel.

In a further construction of the above embodiment, it is proposed that the coupling between film forward moving handle and the film take-up spool consist of a spring biassed coupling member supported on the forward movement handle. This member can be disengaged by means of the lever scanning the space of the magazine cartridge, from a cam interacting with the take-up spool. In this connection, it is advantageous if the coupling member is constructed two-armed with one arm being movable into the range of movement or outside of the range of movement of the cam, and the other arm interacting with the lever.

According to a second novel embodiment, it is proposed that the device consist of a lever scanning the space for the film magazine cartridge, which when the magazine cartridge is missing, the lever assumes a position as a stop member to prevent movement of the film forward moving handle.

The above second embodiment can be easily constructed if the lever incorporates a flange which is swingable into or out of the range of movement of a pin on the film forward moving handle.

According to a third novel embodiment, however, it is also possible that the device encompass a lever scanning the film track, instead of the film cartridge area. When the film is missing, the lever then prevents a turning of the film take-up spool.

In the above third embodiment the lever is prevented from scanning the flange instead of the film at the film take-up spool, thereby preventing release of the film take-up spool for forward movement unless there is film in the camera. This is accomplished in the flange provided with teeth which are inserted in the notches of the camera. Lever and flanges can be conducted thereby in such a manner that they do not engage each other. Furthermore, it is particularly advantageous in the use of the third embodiment if the toothed flange includes guiding pins for the film channel. In this manner, even a narrow film starting strip can be constructed in such a way so as not to be able to slip sideways from the range of the scanning lever. Furthermore it can be advantageous that the toothed flange have a perforation interacting with the sprocket wheel of the camera. In this case in using the first embodiment, even the sprocket wheel together with the film take-up spool must be uncoupled from the film forward moving handle.

Further advantages and particulars of the improvement are explained in more detail by means of the drawings wherein:

FIGURE 3 is a cross-sectional view through FIGURE 1 along the line III—III; and

FIGURE 4 is a view similar to FIGURE 3 of another embodiment of this invention.

Figure 2:
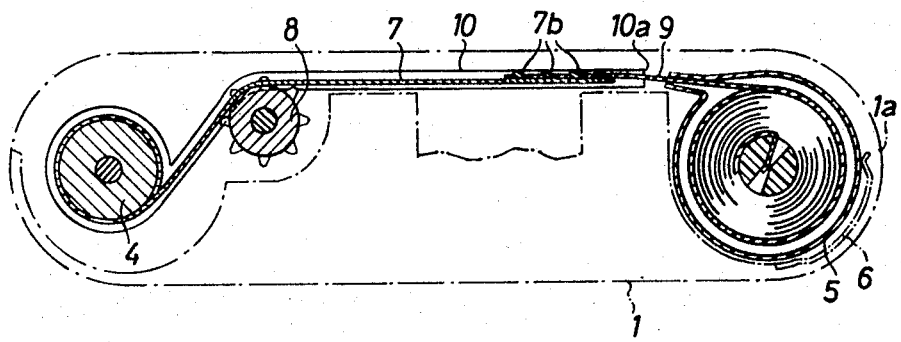
FIGURE 2 is a cross-sectional view through FIGURE 1 along the line II—II.

As shown in the figures the camera housing 1 is provided with a top 2, the picture gate 3, a film take-up spool 4, a film magazine cartridge 5, and a retaining spring 6 for the magazine cartridge 5. The film take-up spool 4 can be arranged in a cartridge which is not shown in the figures in order to facilitate inspection. Attached to the take-up spool 4 is a flange or a band which has perforations 7a engaging the sprocket wheel 8 (FIGURE 2). Flange or band 7 also has teeth 7b at its free end at a spacing which corresponds to the perforation holes 7a which, in turn, corresponds to the film perforations. The perforations of the film start 9 can be inserted upon teeth 7b in the known manner either by hand or automatically. Band 7 can be guided in grooves 10 which are disposed outside the film channel. The wind-off length (i.e. amount to which band 7 extended from spool 4) is limited by the end stops 10a of grooves 10. At band 7 guiding lugs 7c are provided for the guiding of the film start 9, customary with microfilms. Advantageously lugs 7c have only approximately the height of the film thickness, to conserve space.

In known arrangements of this type it is possible for an operator to activate the film forward moving handle 11 without having the film start 9 connected to teeth 7b or without having a magazine cartridge 5 inserted in the camera. This thereby results in that band 7 being wound on the take-up spool 4 or into the film take-up cartridge. Thus band 7 is then no longer or is insufficiently available for connection to the film start 9. According to this invention, a device is provided in the camera 1 which prevents either an activation of the film take-up spool 4 and/or of the sprocket wheel 8 in the event of a missing magazine cartridge 5 or of a missing film 9.

Figure 1:
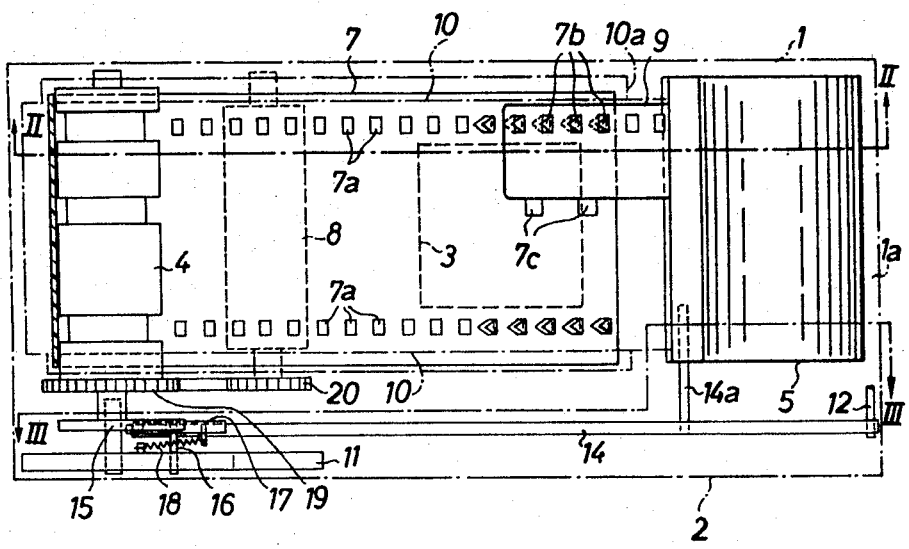
FIGURE 1 is a plan view of a camera in accordance with this invention.

According to the embodiment of FIGURES 1 to 3, this device consists of a lever 14 rotatable about axis 12. Arm 14a of lever 14 projects into the space 1a for the magazine cartridge 5 under the effect of spring 13 which reacts against lever 14.

As shown in FIGURES 1 to 3 rotatable handle 11 carries pin 16 which acts as an axis for rotatable lever 17. In the operative position spring 18 reacts between two armed lever 17 and handle 11 to urge arm 17b against cam portion 15a as shown in FIGURE 3. In this position when handle 11 is rotated, pin 16 and its lever 17 are carried along with it which, in turn, rotationally drives cam 15. As indicated in FIGURE 1 cam 15 is coaxially mounted with gear 19 in such a manner that rotation of cam 15 causes gear 19 to rotate. Gear 19 is connected with the take-up spool 4, driving the sprocket wheel 8 over a gear 20.

If no magazine cartridge 5 is inserted in the cartridge space 1a, arm 14a affected by spring 13 projects into the cartridge space 1a. This presses the free end of lever 14 upon arm 17a of lever 17 and swings its other arm 17b out of the range of cam 15a of the cam plate 15. If the film transport handle is then activated, this movement will not be transmitted to the cam plate 15. The film take-up spool 4 and the sprocket wheel 8 are thus not turned, so that band 7 cannot be wound on the take-up spool 4. However, if a magazine cartridge 5 is inserted into the camera (as shown in FIGURE 3), cartridge 5 turns arm 14a and thereby lever 14 counterclockwise. Lever 14 is disengaged from lever 17, so that end 17b comes to rest before cam 15a due to the action of spring 18. When the film transport handle 11 is activated, arm 17b pushes cam 15a counterclockwise, so that the take-up spool 4 and the sprocket wheel 8 are turned. Thus, film 9 attached to band 7 is wound upon take-up spool 4.

In the embodiment according to FIGURE 4 the coupling is also maintained between film feed handle 11 and film take-up spool 4. For this purpose handle 11 has a stop abutment 11a. In this construction lever 14 includes a flange 14b. When there is no magazine cartridge 5 inserted into the camera, arm 14a projects into the cartridge space, flange 14b is moved into the path of forward movement of stop 11a. As a result the forward movement handle 11 is blocked against any movement. However, if a magazine cartridge 5 is inserted into the camera, it presses arm 14a from the cartridge space 1a, so that flange 14b is moved away from the range of movement of stop 11a thereby permitting the activation of the forward movement handle 11.

Of course the improvement is not limited to the embodiment examples shown. Instead of scanning or sensing the cartridge space 1a, lever 14 could also scan the film track in the space remaining between stop 10a and the magazine cartridge 5. In the event of missing film 9, lever 14 could either disengage coupling 15, 17 or could prevent forward movement handle 11 against any motion.

Where, however, film 9 is present, lever 14 is lifted so that coupling 15, 17 are engaged or so that the forward movement handle 11 is released for activation. In a ramification it would also be possible to eliminate perforations 7a from flange 7, attached to take-up spool 4, with perforations 7a. Then in this embodiment which would be similar to FIGURE 1, the sprocket wheel 8 would not necessarily be uncoupled from the forward movement handle 11 in the even of a missing magazine cartridge 5.

Obviously many modifications and variations of the present invention are possible in light of the above teaching. It is therefore to be understood that within the scope of the appended claims the invention may be practiced otherwise than as specifically described.

What is claimed is:

1. In a photographic camera having a film take-up spool, a film winding band connected to said spool, film connection means on said band, and means associated with said spool for preventing movement of said spool when film is missing from said camera, a space being provided therein for receiving a film magazine cartridge, drive means for rotating said spool, a film feed handle engageable with said drive means by means of a coupling, said means for preventing movement including a scanning lever urged toward said cartridge space for inactivating said coupling when said lever is in said space, said coupling including a resiliently biased coupling lever on said handle, a cam plate interacting with said spool, said coupling lever being movable into engagement with said cam plate when a cartridge is in said space and being movable out of engagement with said cam plate when said scanning lever is in said space, said coupling lever including a first arm movable into and out of the range of movement of said cam plate, and a second arm disposed in the path of movement of said scanning lever.

2. In a photographic camera having a film take-up spool, a film winding band connected to said spool, film connection means on said band, and means associated with said spool for preventing movement of said spool when film is missing from said camera, a space being provided therein for receiving a film magazine cartridge, a film feed handle, drive means connecting said film feed handle to said spool, and said means for preventing movement including a scanning lever urged toward said space and movable into the path of movement of said handle to prevent turning of said handle.

3. The camera of claim 2 wherein said scanning lever includes a flange, said handle including a lug, and said flange being disposable into and out of the path of motion of said lug.

4. In a photographic camera having a film take-up spool, means for receiving a film magazine cartridge and film unit, a film winding band connected to said spool, film connection means on said band for connecting said band to the film in said cartridge, winding means for said take-up spool, transmission means connecting said winding means to said take-up spool whereby the film from said cartridge may be wound onto said take-up spool, cartridge detecting means including lever means biased toward said cartridge and film unit and engageable with said transmission means whereby the presence of a cartridge and film unit in said camera causes said lever means to be disengaged from said transmission means and the absence of a cartridge and film unit causes said lever means to move into the space normally occupied by the cartridge and film unit with lever means engaged with said transmission means to inactivate said transmission means and prevent movement of said take-up spool.

5. The camera of claim 4 wherein said lever means includes a scanning lever urged into the space normally occupied by the cartridge of said cartridge and film unit.

6. The camera of claim 4 wherein said lever means includes a scanning lever urged into the path of movement of the film of said cartridge and film unit.

7. The camera of claim 4 wherein said film connection means includes film holding teeth on said band, and grooves being in said camera for guiding said band.

8. The camera of claim 4 wherein said film connection means includes film holding teeth on said band, and guide pins being on said band for guiding the film lead against lateral slippage.

9. The camera of claim 1 wherein a sprocket wheel is in said camera, said film connection means being teeth on said band, and said band including at least one perforation engageable with said sprocket wheel.

References Cited

UNITED STATES PATENTS

| | | | |
|---|---|---|---|
| 2,092,177 | 9/1937 | McClay | 352—224 |
| 2,148,636 | 2/1939 | Muller et al. | 95—31 |
| 2,176,507 | 10/1939 | Nagel | 242—71.1 |
| 2,674,931 | 4/1954 | Mihalyi | 95—31 |
| 3,148,605 | 9/1964 | Peterson et al. | 95—31 |

NORTON ANSHER, Primary Examiner

J. F. PETERS, Jr., Assistant Examiner